US009662608B2

(12) United States Patent
Park et al.

(10) Patent No.: US 9,662,608 B2
(45) Date of Patent: May 30, 2017

(54) METHODS AND SYSTEMS FOR CAPTURING CARBON DIOXIDE AND PRODUCING A FUEL USING A SOLVENT INCLUDING A NANOPARTICLE ORGANIC HYBRID MATERIAL AND A SECONDARY FLUID

(75) Inventors: Ah-Hyung Alissa Park, New York, NY (US); Camille Petit, New York, NY (US); Youngjune Park, Daejeon (KR); Kun-Yi Andrew Lin, Notre Dame, IN (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/237,683

(22) PCT Filed: Aug. 7, 2012

(86) PCT No.: PCT/US2012/049865
§ 371 (c)(1),
(2), (4) Date: Apr. 16, 2014

(87) PCT Pub. No.: WO2013/022894
PCT Pub. Date: Feb. 14, 2013

(65) Prior Publication Data
US 2015/0014182 A1    Jan. 15, 2015

Related U.S. Application Data

(60) Provisional application No. 61/680,083, filed on Aug. 6, 2012, provisional application No. 61/521,276, filed on Aug. 8, 2011.

(51) Int. Cl.
*B01D 53/14* (2006.01)
*C25B 3/00* (2006.01)
(Continued)

(52) U.S. Cl.
CPC ..... *B01D 53/1493* (2013.01); *B01D 53/1475* (2013.01); *B01J 20/28007* (2013.01);
(Continued)

(58) Field of Classification Search
CPC ... C25B 3/00; C25B 9/00; B01D 53/14; B01J 20/22
(Continued)

(56) References Cited

U.S. PATENT DOCUMENTS 3,852,180 A * 12/1974 Gregory ................... C07C 1/12
                                                              204/246
5,928,806 A *  7/1999 Olah ......................... C25B 3/04
                                                              204/DIG. 4

(Continued)

FOREIGN PATENT DOCUMENTS

WO    WO 2009/108064 A1 *  9/2009

OTHER PUBLICATIONS

Rodriguez et al. "Nanoscale Ionic Materials" Adv. Mater. 2008, 20, 4353-4358.*
(Continued)

*Primary Examiner* — Harry D Wilkins, III
(74) *Attorney, Agent, or Firm* — Murtha Cullina LLP; Anthony P. Gangemi

(57) ABSTRACT

Methods and systems for capturing carbon dioxide and producing fuels such as alcohol using a solvent including a nanoparticle organic hybrid material and a secondary fluid are disclosed. In some embodiments, the methods include the following: providing a solvent including a nanoparticle organic hybrid material and a secondary fluid, the material being configured to capture carbon dioxide; introducing a gas including carbon dioxide to the solvent until the material is loaded with carbon dioxide; introducing at least one of catalysts for carbon dioxide reduction and a proton source to (Continued)

the solvent; heating the solvent including the material loaded with carbon dioxide until carbon dioxide loaded on the material is electrochemically converted to a fuel.

1 Claim, 3 Drawing Sheets

(51) Int. Cl.
B01J 20/32 (2006.01)
C25B 9/00 (2006.01)
B01J 20/28 (2006.01)

(52) U.S. Cl.
CPC ......... *B01J 20/3204* (2013.01); *B01J 20/327* (2013.01); *B01J 20/3212* (2013.01); *B01J 20/3272* (2013.01); *B01J 20/3293* (2013.01); *C25B 3/00* (2013.01); *C25B 9/00* (2013.01); *Y02C 10/06* (2013.01); *Y02C 10/08* (2013.01); *Y02P 20/152* (2015.11)

(58) Field of Classification Search
USPC .......................... 205/450; 204/274; 502/401
See application file for complete search history.

(56) References Cited

U.S. PATENT DOCUMENTS

| 7,795,175 B2* | 9/2010 | Olah | B01D 53/025 |
| | | | 502/400 |
| 7,799,299 B2* | 9/2010 | Heldebrant | B01D 53/1456 |
| | | | 423/220 |
| 2002/0058175 A1* | 5/2002 | Ruhl | C25B 1/02 |
| | | | 429/430 |
| 2007/0108056 A1* | 5/2007 | Nyberg | B01D 61/44 |
| | | | 204/554 |
| 2011/0114504 A1 | 5/2011 | Sivasankar et al. | |

OTHER PUBLICATIONS

Park et al. "CO2 Capture Using Nanoparticle Ionic Materials and Task-Specific Ionic Liquids", 2009 AIChE Spring National Meeting.*
Lin, K.A., et al., "Effects of Bonding Types and Functional Groups on CO2 Capture using Novel Multiphase Systems of Liquid-like Nanoparticle Organic Hybrid Materials," Environmental Science & Technology, vol. 45, pp. 6633-6639, 2011.
International Search Report and the Written Opinion of the International Searching Authority, International Application No. PCT/US2012/049865, filed Oct. 5, 2012.

* cited by examiner

US 9,662,608 B2

METHODS AND SYSTEMS FOR CAPTURING CARBON DIOXIDE AND PRODUCING A FUEL USING A SOLVENT INCLUDING A NANOPARTICLE ORGANIC HYBRID MATERIAL AND A SECONDARY FLUID

CROSS REFERENCE TO RELATED APPLICATION(S)

This application claims the benefit of U.S. Provisional Application Nos. 61/521,276, filed Aug. 8, 2011, and 61/680,083 filed Aug. 6, 2012, each of which is incorporated by reference as if disclosed herein in its entirety.

BACKGROUND

The rapid increase in carbon dioxide emissions from industrial sources has been considered as one of the main causes of climate change. Carbon dioxide is one of the greenhouse gases and its atmospheric concentration has increased at an annual rate of about 2 ppm, and thus, the development of efficient carbon dioxide capture technologies is essential for the future of carbon-based energy. The reduction of carbon dioxide emissions can be achieved by improving energy efficiency, implementing renewable carbon-free energy sources, and developing carbon capture, utilization and storage (CCUS) technologies.

Worldwide energy use will continue increasing; thus, CCUS could provide an immediate solution to the global carbon imbalance. If CCUS technologies can incorporate renewable energy, their overall sustainability will be further improved. Most of the focus in the CCUS field has been placed on using amine-based solvents that react with gaseous carbon dioxide to form carbamates, thus capturing the carbon dioxide. Among the amine-based solvents, monoethanolamine (MEA) is one of the most favored solvents for carbon dioxide capture due to its high carbon dioxide capture capacity and fast reaction kinetics. In many CCUS schemes, the MEA process is combined with geological storage of the captured carbon dioxide. While these technologies have already been demonstrated in large scales, the MEA process and geological storage of carbon dioxide still face challenges such as high parasitic energy consumption during solvent regeneration and the permanence and accountability issues for long-term carbon dioxide storage. In addition, MEA has high volatility, and therefore, its corrosive fume is a concern for the process design and operation. The concentration of MEA has to be limited to 15-30 wt % and this makes the carbon dioxide capture and the solvent regeneration processes complicated and costly.

In answer to these concerns associated with MEA, a number of innovative organic and inorganic materials including amine functionalized solid mesoporous sorbents and liquid solvents, i.e., ionic liquids and organic solvents such as aminosilicone, are being developed to capture carbon dioxide. Ionic liquids are particularly intriguing since they generally exhibit negligible vapor pressure even at elevated temperatures. Ionic liquids can be synthesized with task-specific functional groups, (e.g., amine groups for carbon dioxide capture, and they can also possess interesting features such as reversible and phase changing behaviors. The current drawbacks of ionic liquids as carbon dioxide capture media include their complex synthesis and purification steps, and high cost.

SUMMARY

Aspects of disclosed subject matter include methods, systems, and materials for carbon capture and conversion technology that combine carbon dioxide capture and its electrochemical conversion into fuels using dual-purpose hybrid binary systems. The binary systems are used as both carbon dioxide capture and electrolyte media. Embodiments of the disclosed subject matter include solvents having (i) smart hybrid nanomaterials comprising inorganic cores with a grafted polymeric canopy and (ii) an organic or aqueous secondary fluid with lower viscosity. Owing to their inorganic component, the nanomaterials exhibit excellent thermal stability, negligible vapor pressure, and attractive chemical and physical tunability. The structures and chemistries of the core and canopy materials are engineered to achieve maximum carbon dioxide capture and selectivity as well as high ionic conductivity for the subsequent carbon dioxide electrochemical conversion to alcohols.

Because of the anticipated high viscosity of the nanomaterials, a secondary fluid is used to enhance transport properties of the solvent system. The selected secondary fluids may also exhibit carbon dioxide capture capability and, in some cases, ionic conductivity and phase-changing properties. The proposed dual-purpose hybrid binary system minimizes the overall parasitic energy consumption and cost associated since energy provided for the solvent regeneration is used in carbon dioxide conversion. The carbon dioxide-loaded solvent acts as the carbon dioxide source for the fuel synthesis.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
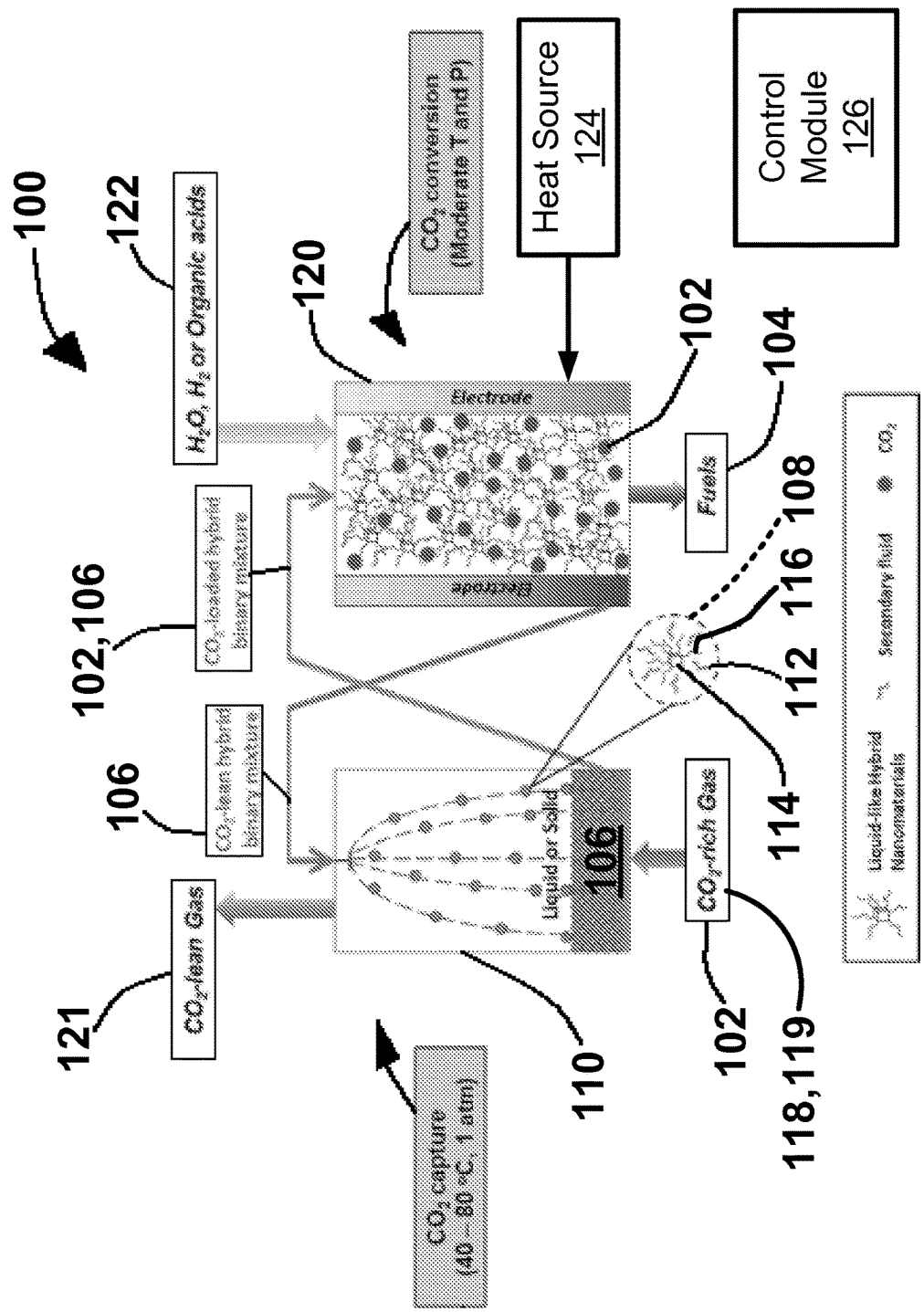
FIG. 1 is a schematic diagram of methods and systems according to some embodiments of the disclosed subject matter.
Figure 2:
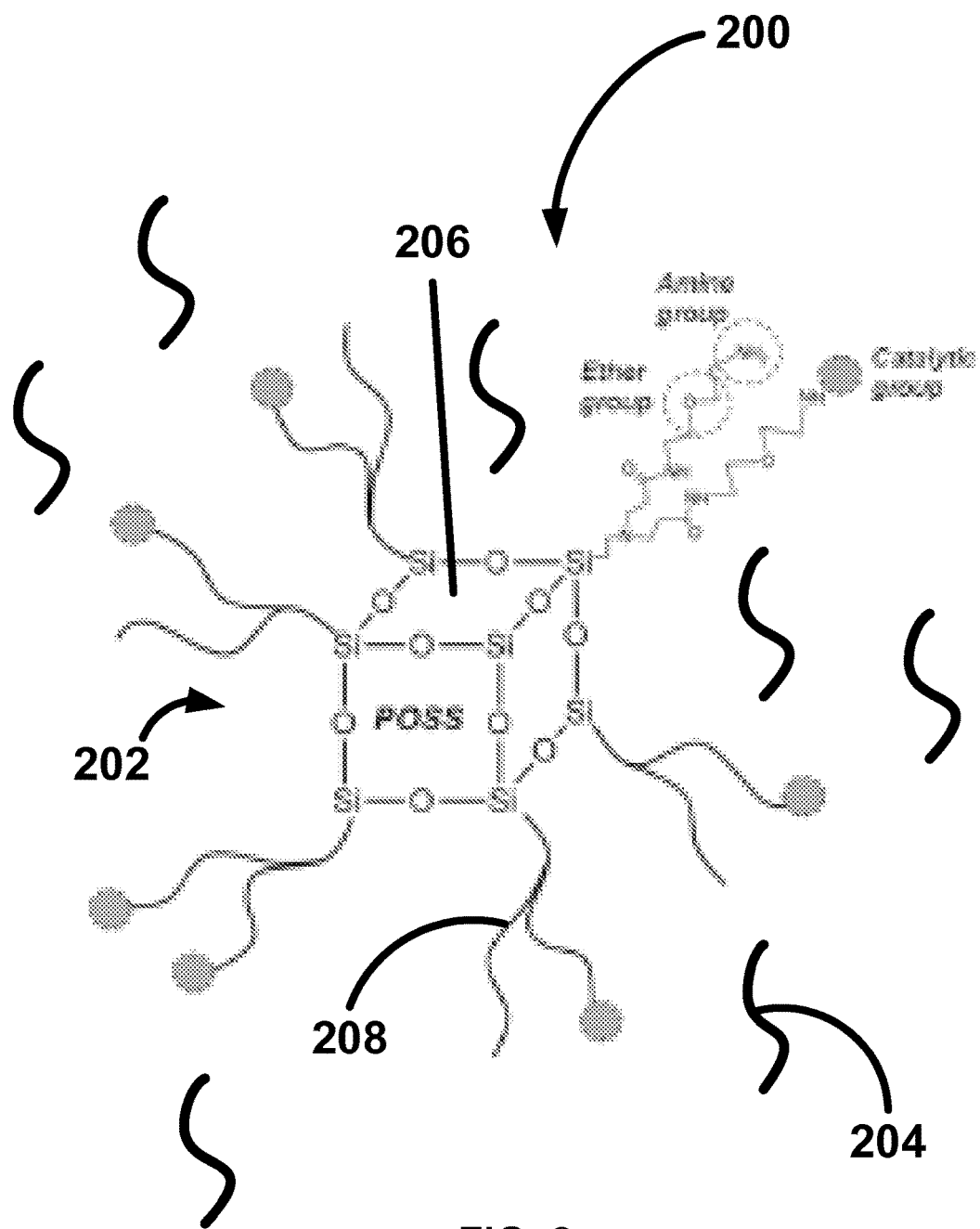
FIG. 2 is a schematic diagram of a nanoparticle organic hybrid material according to some embodiments of the disclosed subject matter.

Referring to FIGS. 1 and 2, aspects of the disclosed subject matter include a system 100 for capturing carbon dioxide 102 and producing a fuel 104 using a solvent 106 including a nanoparticle organic hybrid material 108.

System 100 includes a carbon capture reactor 110 including solvent 106. Solvent 106 includes nanoparticle organic hybrid material 108, which is configured to capture carbon dioxide 102, and a secondary fluid 112 for reducing the viscosity of the material and solvent.

Secondary fluid 112 is typically formed from one of water, a polymer, a carbon dioxide binding organic liquid, an aminosilicone solvent, and a combination thereof.

Material 108 includes a core 114 having a polymeric canopy 116 tethered thereon and extending therefrom. Core 114 is typically fabricated from one or more of a polyhedral oligomeric silsesquioxane, a carbon nanotube, a silica nanoparticle, a titanium oxide nanoparticle, and a combination thereof. Canopy 116 is formed from a material including one of polyethyleneimine, polyetheramine, allyl-terminated polyethylene glycol, and a combination thereof. In some embodiments, the density of canopy 116, which is grafted to core 114, is preselected based on a desired rate of carbon capture by controlling viscosity.

System 100 includes a source 118 of gas 119 including carbon dioxide 102 in fluid communication with carbon capture reactor 110 and an electrochemical reactor 120. An example of source 118 includes captured and collected flue gases from a coal power plant. A substantially carbon dioxide free gas 121 is released from carbon capture reactor 110.

System 100 includes electrochemical reactor 120, which is in fluid communication with carbon capture reactor 110. In some embodiments, reactor 110 and reactor 120 are the same reactor.

System 100 includes a source 122 of catalysts for carbon dioxide reduction and protons. Source 122 is in fluid communication with electrochemical reactor 120.

System 100 includes a heat source 124 for heating the combined solvent regeneration via electrochemical reactor 120.

System 100 includes a control module 126 for controlling operation of the system. Control module 126 directs by wired or wireless connection and via a combination of pumps, valves, and/or conduits etc., solvent 106 to carbon capture reactor 110 until nanoparticle organic hybrid material 108 is loaded with carbon dioxide 102. Control module 126 provides at least one of catalysts and one of protons from source 122 of catalysts and protons to electrochemical reactor 120 and regulates the level of heat source 124 so that solvent 106 is heated until carbon dioxide 102 loaded on material 108 is electrochemically converted to a fuel.

Referring now to FIG. 2, some embodiments of the disclosed subject matter include a solvent 200 having nanoparticle organic hybrid materials 202 for capturing carbon dioxide and producing a fuel and a secondary fluid 204 for reducing the viscosity of the materials and the solvent.

Nanoparticle organic hybrid materials 202 each include a core 206 having a polymeric canopy 208 tethered thereon and extending therefrom. Core 206 is fabricated from one or more of a polyhedral oligomeric silsesquioxane, a carbon nanotube, a silica nanoparticle, a titanium oxide nanoparticle, and a combination thereof. Canopy 208 is formed from a material including one of polyethyleneimine, polyetheramine, allyl-terminated polyethylene glycol, and a combination thereof.

Secondary fluid 204 is selected from one of water, a polymer, a carbon dioxide binding organic liquid, an aminosilicone solvent, and a combination thereof. The carbon dioxide binding organic liquid is formed from a strong base, e.g., guanidine, amidine, or similar, and an alcohol, e.g., ethanol, propanol, butanol, or similar.

Figure 3:
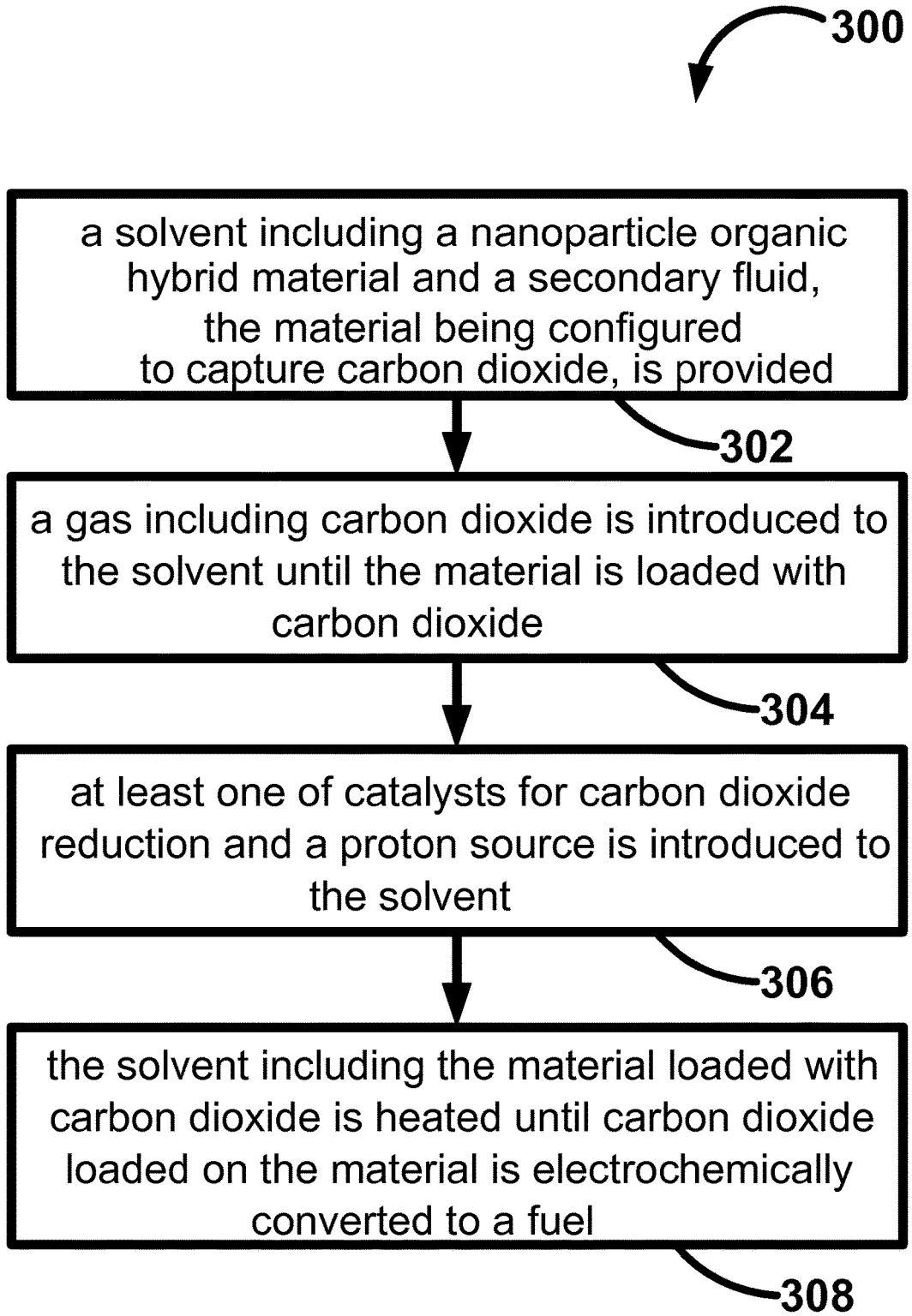
FIG. 3 is a chart of a method according to some embodiments of the disclosed subject matter.

Referring now to FIG. 3, some embodiments of the disclosed subject matter include a method 300 for capturing carbon dioxide and producing a fuel using a solvent including a nanoparticle organic hybrid material. At 302, a solvent including a nanoparticle organic hybrid material, the material being configured to capture carbon dioxide, is provided.

The material includes a core having a polymeric canopy tethered thereon and extending therefrom. The core is fabricated from one or more of an inorganic material and an organic material. Examples of the organic material include a polyhedral oligomeric silsesquioxane and examples of the inorganic material include one of a carbon nanotube, a silica nanoparticle, a titanium oxide nanoparticle, and a combination thereof. The canopy is typically formed from a material including one of polyethyleneimine, polyetheramine, allyl-terminated polyethylene glycol, and a combination thereof. The solvent includes a secondary fluid for reducing a viscosity of the materials and the solvent. The secondary fluid is selected from one of water, a polymer, a carbon dioxide binding organic liquid, an aminosilicone solvent, and a combination thereof. The carbon dioxide binding organic liquid is formed from a strong base and an alcohol.

At 304, a gas including carbon dioxide is introduced to the solvent until the material is loaded with carbon dioxide. At 306, at least one of catalysts for carbon dioxide reduction and a proton source is introduced to the solvent. At 308, the solvent including the material loaded with carbon dioxide is heated until carbon dioxide loaded on the material is electrochemically reduced to a fuel.

Methods and systems according to the disclosed subject matter offer benefits over known technologies. They lower the net parasitic energy consumption and operating cost related to solvent regeneration compared to state-of-the-art technology, e.g., $CO_2$ capture using MEA combined with geological storage. By combining carbon dioxide capture and conversion processes, a unique material platform that consists of dual-purpose binary mixtures of hybrid materials can be used. Since heat provided for solvent regeneration is inherently used curing carbon dioxide conversion, there will be minimal loss of energy.

The relatively straightforward synthesis methods, i.e., usually only two or three synthesis steps involved, required for the synthesis of hybrid nanomaterials in methods and systems according to the disclosed subject matter allow for relatively easy scale-up and industrial implementation of such carbon dioxide capture media. The cost of the hybrid materials disclosed herein is reasonable since unlike other novel solvents such as ionic liquids, most of the raw materials are already available in commercial scale.

The compounds used for the synthesis of the hybrid nanomaterials disclosed herein are environmentally friendly compounds, and thus, have a sustainable character and further support the potential for large-scale applications. In embodiments including a two-reactor scheme, the reactor designs are relatively simple, which facilitates implementation on a large-scale.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A reactor for capturing carbon dioxide and producing fuels using a solvent including a nanoparticle organic hybrid material and a secondary fluid, said reactor comprising:
   a reactor body including a plurality of electrodes and a solvent having a nanoparticle organic hybrid material and a secondary fluid, said material being configured to capture carbon dioxide;
   a source of gas including carbon dioxide in direct contact with said solvent within said reactor body;
   a source of catalysts for carbon dioxide reduction and protons, said source external to and in fluid communication with said reactor body;
   a heat source separate from said electrodes for heating said reactor body; and
   a control module for directing said source of gas to said reactor body until said material is loaded with carbon dioxide, for providing at least one catalysts and one protons from said source of catalysts and protons to said reactor body, for controlling said electrodes such that the reactor body functions as an electrochemical reactor, and for controlling said heat source so that said solvent including said material loaded with carbon dioxide is heated until carbon dioxide loaded on said material is electrochemically converted to fuels.

\* \* \* \* \*